United States Patent

[11] 3,617,388

| [72] | Inventors | Seigo Matsuda<br>Wayland;<br>John J. O'Connell, Waltham, Mass.;<br>Marshall C. Freerks, Kirkwood, Mo. |
|---|---|---|
| [21] | Appl. No. | 567,394 |
| [22] | Filed | July 25, 1966 |
| [45] | Patented | Nov. 2, 1971 |
| [73] | Assignee | Monsanto Research Corporation<br>St. Louis, Mo. |

[54] METHOD OF ACTIVATING FUEL CELL ANODES
2 Claims, No Drawings

[52] U.S. Cl. ..................................................136/120 FC,
                                                                                            136/86
[51] Int. Cl. .............................................................H01m13/00,
                                                                                    H01m 27/00
[50] Field of Search............................................ 136/120,
    26, 86, 136, 137, 139, 175; 252/431, 460, 472;
                                                                          204/130, 131

[56]                     References Cited
                   UNITED STATES PATENTS
3,284,332   11/1966   Gladrow...................... 204/284
3,410,731   11/1968   Rightmire..................... 136/153
3,410,727   11/1968   Jasinski......................... 136/86
2,777,805   1/1957    Lefrancois..................... 252/472
3,067,276   12/1962   Gruneberg..................... 204/130
3,196,048   7/1965    Shropshire.................... 136/86
3,272,853   9/1966    Braun............................ 252/431
3,282,735   11/1966   Kring............................. 136/86
3,297,484   1/1967    Niedrach....................... 136/86
3,311,508   3/1967    Biddick......................... 136/86

OTHER REFERENCES
Martell & Calvin, Chemistry of Metal Chelate Compounds (1952) p. 378
West & Todd, Textbook of Biochemistry (2nd ed., 1957) pp. 826– 827.

*Primary Examiner*—Winston A. Douglas
*Assistant Examiner*—Peter D. Rosenberg
*Attorneys*—Robert M. Dickey, Lorna A. Ferris and Mary B. Moshier

ABSTRACT: A novel fuel cell comprising a cathode, means to introduce an oxidizing agent to said cathode, an electrolyte separating said cathode from an anode comprising a conductive base material and a metal chelate as a catalytic component thereof and means to introduce a fuel to said anode.

METHOD OF ACTIVATING FUEL CELL ANODES

This invention relates to fuel cells. More precisely, the invention disclosed herein relates to fuel cell components, especially the anode electrode thereof, and to catalysts which can be advantageously employed in combination with such anodes. The invention further relates to processes for producing improved anodes for fuel cells.

Fuel cells and the operating characteristics thereof are well known to the art. Broadly, fuel cells are electrochemical reaction devices which can convert chemical energy to electrical energy so long as reactants are continually supplied thereto. Essentially, a typical fuel cell includes two electrodes—an anode and cathode—separated by an electrolyte, means to continually supply an oxidizing agent to the cathode, and means to continually supply an oxidizable fuel to the anode. The electrodes employed in fuel cells comprise a conductor base material for transporting electrical energy produced in the cell and a catalytic component which can efficiently promote the desired half-cell reaction at each electrode.

In conventional practice, the fuel is introduced to one side of the cell in a space between the anode and the housing. The fuel diffuses through the anode and is absorbed on the surface thereof where the fuel is oxidized to produce free electrons.

The anode and cathode are connected in a fashion to provide an external path so that free electrons generated at the anode can flow therethrough to the cathode thereby providing current which can be used to perform work.

At the opposite side of the cell, the oxidizing agent is fed into the space between the cathode and the housing. The oxidizing agent is absorbed on the surface of the cathode and reacts with incoming electrons to produce chemical species which migrate to the anode to complete the circuit.

To date, the most effective catalyst components for fuel cell anodes have been metals of the platinum group, i.e., platinum and palladium. For example, in low-temperature, low-pressure fuel cells, anodes comprising platinum metal are almost exclusively employed. This has been one of the most outstanding factors which has hindered the widespread commercial acceptance of fuel cells in such day-to-day applications in which primary batteries are presently employed. As those well skilled in the art know, platinum is an extremely costly material and moreover, rather limited in quantity. Accordingly, any discovery whereby active anodes for fuel cells can be produced without necessarily employing platinum metal therein would be indeed a notable contribution to the art.

A principle object of the present invention is to provide improved fuel cells.

Another object of the present invention is to provide active but relatively inexpensive anodes for fuel cells.

Still another object of the present invention is to provide catalyst components which can be advantageously employed in anodes for fuel cells.

A further object of the present invention is to provide an improved method for producing anodes for fuel cells.

Another more specific object of the present invention is to provide a novel diffusion membrane anode for fuel cells.

Other objects and advantages of the present invention will in part be apparent to those skilled in the art or will in part, appear hereinafter.

Broadly, the above objects and advantages are realized in accordance with the discovery that compounds known to the art Accordingly, metal chelates can be advantageously employed as catalyst components in anodes of fuel cells. The anodes of the present invention comprise two essential ingredients, a conductor material and a metal chelate as the catalytic component thereof.

The metal chelates included within the scope of the present invention include those comprising a transition metal bonded to organic ligands in such a fashion as to form square planar or distorted planar chelate ring systems as distinguished from $\pi$ complexes of the ferrocene type. Accordingly the outstanding characteristic of metal chelates useful in the present invention is that said metal chelates have at least one coordinating site available on the metal ion. According to a theory which has been postulated but to which there is no intention to be bound, it is believed that the existence of at least one, but preferably two, available coordinating site(s) is the factor that determines whether a metal chelate will be catalytically active in anodes of the present invention.

Metal chelates of the above-description structure preferably comprise metals of the first transition series, namely scandium, titanium, vanadium, chromium, manganese, iron, cobalt, nickel, copper and zinc as well as $d_8$ and $d_9$ metals of the second and third transition series namely palladium, platinum, silver and gold. $D_8$ and $d_9$ metals are those metals having 8 and 9 electrons respectively in their $d$ orbitals. Especially preferred metals are those of platinum, palladium, zinc, copper, nickel, cobalt, chromium, and vanadium. The organic ligands which can be combined with ions of the above-mentioned metals include ligands of strong, moderate or weak ligand field strength such as those of phthalocyanine, hexafluoroacetylacetone, acetylacetone, bis-acetylacetoneethylenediimine, 8-hydroxyquinoline, tetrabenzodiazoporphine, bis-salicylaldehydeethylenediimine, tetraphenylporphine, polychlorophthalocyanine, 8-chlorophthalocyanine and others which could be mentioned. Especially preferred are metal chelates comprising the phthalocyanine ligand. Accordingly, specific compounds representative of preferred metal chelates include among others: platinum (II) phthalocyanine, palladium (II) phthalocyanine, zinc (II) phthalocyanine, copper (II) phthalocyanine, nickel (II) phthalocyanine, cobalt (II) phthalocyanine, chromium (II) phthalocyanine and vanadyl (IV) phthalocyanine. Other specific metal chelates which are suitable as catalyst components in anodes for fuel cells include among others: manganese (II) hexafluoroacetylacetone, cobalt (II) 8-hydroxyquinoline, cobalt (II) bis-salicylaldehydeethylenediimine, nickel (II) tetraphenylporphine, nickel (II) hexafluoroacetylacetone, copper (II) 8-hydroxyquinoline, copper (II) bis-salicyladehydeethylenediimine, zinc (II) tetraphenylporphine, palladium (II) acetylacetone, palladium (II) 8-hydroxyquinoline, platinum (II) 8-hydroxyquinoline, and platinum (II) tetraphenylporphine.

The conductor materials useful in the anodes of the present invention are preferably in the form of finely divided particulate solids initially since in the preferred anodes, said material also functions as a support for the metal chelate catalyst. The most efficient conductor materials are those having high conductivity and surface characteristics such that the solid can absorb or concentrate the fuel in the vicinity of the chelate. The preferred conductor materials are further characterized by low average particle size, i.e., below about 1 micron. By average particle size, it is meant that the greater number of particles will be of the particle size recited although particles of lower and higher particle size can be present. Accordingly, conductive carbon blacks such as acetylene black or conductive furnace blacks are eminently qualified as conductor materials in anodes of the present invention. However, it is to be understood that carbon fibers, for example fibers which are about 0.35 to 0.45 mils in diameter and about 0.25 inch long can also be employed as part or all of the conductor material. Moreover, finely divided metallic conductor materials known to the art as silver black, gold black, platinum black and the like can also be employed in anodes of the present invention.

Oftentimes, a binder is also included in the anodes of the present invention in amounts sufficient to provide an anode structure of adequate strength and integrity. Hydrophobic binders are especially suitable as binders provided of course, that they are inert to the conditions obtained in an operating fuel cell. Especially preferred binders are the polymers and copolymers of the various halogen-substituted hydrocarbon monomers. Such polymers include polytetrafluorethylene, polyvinyl chloride, polyvinylidene fluoride, polyvinyl fluoride, polytrifluorochloroethylene and the like. Hydrocarbon polymers such as the polymers and copolymers of the $\alpha$ monoolefins can be suitably employed as binders in the anodes of the present invention. Other examples of suitable polymeric binders include silicone polymers, polyvinyl butyral, polystyrene 1 butadiene copolymers, polyamides of hexamethylene diamine and adipic acid, polymethyl methacrylate, polyvinyl ethers, polyvinyl acetate and its partially hydrolyzed derivatives, cellulose derivatives such as methyl cellulose ethers, and the like.

The fabrication of anodes of the present invention can be accomplished in accordance with various methods. However, in the preferred practice of the present invention, the fabrication thereof involves a procedure whereby the metal chelate is absorbed on the surface of the particulate conductive material prior to shaping said ingredients into the ultimate anode form. Many methods can be employed to absorb the metal chelate on the surface of the conductor material. For example, a slurry can be prepared by adding the conductor material to a solution of metal chelate. The addition of a precipitating agent to the slurry can cause the metal chelate to precipitate on the surface of the particulate conductor material. After recovery thereof, a binder can be added thereto and the composition can be shaped into a suitable anode form.

By far the most preferred method for producing anodes of the present invention involves a procedure wherein the conductive material is physically mixed under high shear such as by grinding or the like with a solution of metal chelate. For example, such mixing can be effectively accomplished in a mortar and pestle. Suitable proportions of solution and particulate conductor material are selected so that the final mixture is in the form of viscous paste. The mixture is then dried, preferably in a vacuum oven, to expel substantially all solvent therefrom. After drying, an aqueous or partially aqueous dispersion of a polymeric binder is blended with the particulate conductor material having the metal chelate absorbed on the surface thereof. Preferably the binder employed is a hydrophobic binder such as polytetrafluoroethylene. The proportions of binder dispersion and conductor material are selected so that the ultimate blend is in the form of a viscoelastic dough. The viscoelastic dough is then gently rolled into a thin sheet of membrane thickness and cured on a supporting metal screen to produce an active diffusion membrane anode. Further details relating to the manner of producing the especially preferred diffusion membrane anodes of the present invention can be found in commonly owned copending U.S. Pat. application, Ser. No. 435,821, filed Mar. 1, 1965, now Pat. No. 3,385,736, which is incorporated herein by reference.

The activity of diffusion membrane anodes produced in accordance with the above procedure can be enhanced by an activation technique which is believed can remove any donor materials that may be coordinated to the metal ion in the catalyst, thereby blocking active catalytic sites. Such materials can include residual solvents or dispersants which may have been employed in the fabrication of the diffusion anode. For example, it has been found that the activity of such anodes can be adversely affected by the deliberate addition thereto of materials normally employed as solvents or dispersants in mixing the metal chelate and conductor material. Upon removal of such solvents or dispersants by the activation techniques described hereinafter, the anode manifests high activity.

Generally, the activation technique involves a two step procedure. In the first step, the diffusion membrane anode is heated in vacuum at elevated temperatures for a period of time ranging from about five minutes to three or four hours or longer if desired. Thereafter, the diffusion membrane is activated by connecting same to a DC power source and forcing high current therethrough to polarize the anode to a potential of a value more noble than that of the rest potential of the electrode. "Rest potential" means the potential of the anode measured at open circuit conditions. The anode is maintained at the polarizing potential until activated, e.g., until the potential of the anode is increased to about the same value which would be manifested by a reversible hydrogen electrode. In some instances, the first step of the above-described technique can be dispensed with. For example, the activity of diffusion membrane anodes comprising palladium pthalocyanine as the catalytic component thereof can be improved merely by polarizing same.

The invention as well as manners of practising same and the advantages realized therefrom will be better understood by reference to the following examples. It is to be understood that the following examples are illustrative in nature and in no way are they to be construed so as to limit the invention beyond those limitations expressly set forth in the present specification or in the claims which appear hereinafter.

EXAMPLE 1

A dispersion of palladium (II) phthalocyanine and quinoline is mixed in a mortar and pestle with a conductive carbon black to form a paste. The mixture is then heated in a vacuum oven for about 1 hour to remove quinoline therefrom. The dried mixture is blended with a binder—an aqueous dispersion of polytetrafluoroethylene having about 50 percent solids by weight—to produce a viscoelastic dough. The dough is gently rolled into a membrane of even thickness and cured on a supporting metal screen in accordance with the following schedule: 1

1 hour at room temperature and atmospheric pressure
1 hour at room temperature and 0.1 mm. Hg
1 hour at 140° C. and 0.1 mm. Hg
1 hour at 300° C. and atmospheric pressure The resulting diffusion membrane anode has the following composition; about 12 percent by weight palladium (II) phthalocyanine, about 30 percent by weight binder and about 58 percent by weight carbon. The activity of the diffusion anode was improved by the following procedure. The anode was suspended in and electrolyte (KOH) and connected to the positive pole of a variable DC power supply (5-10 volts). A platinized platinum cathode which serves as a counter electrode was also immersed in the electrolyte and connected to the negative pole of the power supply. By increasing the applied current, the anode is polarized and the extent of polarization is measured relative to a calomel electrode. In the present case, the anode was polarized to about 0.7-1.0 volt more noble than that of the rest potential of the anode. The anode was maintained at the polarized potential for about one minute at which time the measurement between the anode and the calomel electrode indicated that the anode was activated, e.g., the measured potential of the anode was of a value approximately equal to that of the reversible hydrogen electrode at the applied current.

Tables 1 and 2 below evidence the activity of diffusion membrane anodes produced in accordance with the above procedure when same are employed in fuel cells in combination with various electrolytes and fuels.

TABLE 1.—ACTIVITY OF PALLADIUM PHTHALOCYANINE ELECTRODES FOR THE OXIDATION OF HYDROGEN UNDER VARIOUS CONDITIONS

| Electrolyte | Temp., °C. | OCV [1] | Current densities (ma./cm.²) at the listed potentials (volts) vs. H.E.[2] | | |
|---|---|---|---|---|---|
| | | | 0.05 | 0.1 | 0.2 |
| 85% H₃PO₄ | 150 | −0.10 | 400 | 750 | >1,000 |
| 5M H₃PO₄ | 95 | −0.19 | 200 | 300 | 300 |
| 2M H₂SO₄ | 95 | −0.16 | 500 | >1,000 | |
| 3M KOH | 95 | −0.96 | 50 | 100 | ≈1,000 |

[1] OCV=Open circuit voltage.
[2] H.E.=Hydrogen electrode.

From the above data it appears that palladium phthalocyanine is a very active catalyst in a very wide variety of electrolytes.

TABLE 2.—ANODE POTENTIAL FOR A CELL EMPLOYING A PALLADIUM PHTHALOCYANINE ANODE FOR THE OXIDATION OF HYDRAZINE

[Oxidant=Oxygen; Electrolyte=5M KOH]

| Current density, amp/ft.²: | Anode potential [1] |
|---|---|
| OCV | 1.15 |
| 24 | 1.05 |
| 64 | 1.0 |
| 100 | 0.98 |
| 200 | 0.92 |
| 300 | 0.85 |

400 _____ 0.77

[1] Volts vs. SCE (Standard Calomel Electrode) minus IR (Internal Resistance) included.

EXAMPLE 2

Substantially the same procedure as in example 1 is followed to prepare a diffusion membrane anode but chromium (II) phthalocyanine is substituted for the palladium (II) pthalocyanine of example 1. The activity of the cured diffusion anode is improved by heating same to about 400° C. under vacuum and polarizing the anode to 1.2 volts and maintaining the anode at the polarized potential for about 2 hours. Anodes containing chromium phthalocyanine as the catalytic component thereof manifest a similar level of activity as the anodes of example 1.

EXAMPLE 3

An actove anode for a fuel cell is prepared by dissolving vanadyl (IV) phthalocyanine in sulfuric acid. A conductive carbon black is added to the solution and mixed therewith to produce a slurry. Addition of water to the slurry causes precipitation of vanadyl phthalocyanine on the surface of the carbon black. The intimate mixture of carbon and vanadyl phthalocyanine is removed by filtration and dried in a vacuum oven. A binder dispersion like that described in example 1 is blended with the dried mixture to form a viscoelastic dough and the dough is rolled into a sheet which is cured in accordance with the procedure set forth in example 1.

EXAMPLES 4-26

The following examples are set forth in tabular form to illustrated active anodes which comprise metal chelates representative of those within the scope of our invention. In each example, the anode is prepared by the following procedure:

1. A cube of conductive carbon black is dried in a vacuum oven for about 2 hours.
2. The cube is placed in a vacuum chamber maintained at about 100° C. and a solution of the metal chelate is sprayed on the anode. The pressure in the chamber is then quickly reduced to about 1 mm. Hg and the volatile solvent is flashed off.
3. The above procedure is repeated until the concentration of metal chelate on the cube represents from about 1 to about 5 percent by weight thereof.
4. The cube is dried in a vacuum oven at 100° C. at pressures below about 0.1 mm. Hg for about 2 hours prior to the evaluation thereof as anode in a cell.

The anodes of the present invention can be employed in combination with fuel cell fuels known to the art. However, it has been found that anodes comprising particular metal chelates perform especially well in combination with particular fuels. For example, metal chelates comprising chromium or $d_8$ metals and ligands of strong ligand field strength are definitely preferred in anodes operating with hydrogen. For the purposes of the present invention, ligands of strong ligand field strength are those ligands in which the donor atoms are primarily nitrogen. Representative ligands of strong ligand field strength include those of tetraphenylporphine and phthalocyanine. Metal chelates comprising chromium or $d_8$ or $d_9$ metals and ligands of moderate field strength are most advantageously included in anodes operating with hydrazine. Ligands in which the donor atoms are approximately equally distributed between nitrogen and oxygen are ligands of moderate ligand field strength. Representative ligands of moderate ligand field strength include those of bis-acetylacetoneethylenediimine, bis-benzoylacetoneethylenediimine, 8-hydroxyquinoline and bis-salicyladehydeethylenediimine. Anodes comprising metal chelates of $d_9$ metals and ligands of weak ligand strength are especially suitable for the electrooxidation of formic acid. Ligands of weak ligand field strength are those in which the donor atoms are primarily oxygen. Representative ligands of weak ligand field strength include those of 1-hydroxyanthraquinone, 1-hydroxynaphthaquinone, acethyacetone and hexafluoroacetylacetone.

Many of the details offered in the above examples for the purpose of illustrating this invention can be modified without departing from the spirit and scope of this invention as defined in the appended claims.

Having described the invention as well as manners of practicing same together with preferred embodiments thereof, what is claimed as new is as follows:

1. A process for activating a fuel cell anode comprising a metal chelate prior to the use of said anode in an an operating fuel cell which comprises the steps of polarizing said anode to a polarized potential of a value more noble than that of the original rest potential thereof and maintaining said anode at said polarized potential until the potential of the anode is increased to about the same value which could be manifested by a reversible hydrogen electrode.

2. The process of claim 1 further including the step of heating said anode under vacuum prior to polarizing said anode.

| Example Number | Metal chelate | Fuel | Electrolyte | Cell temp., °C. | Open-circuit voltage relative to hydrogen electrode | Polarization from open-circuit at 10 ma./cm[1,2] |
|---|---|---|---|---|---|---|
| 4 | Cobalt (II) bis-salicylaldehydeethylenediimine | Methanol | KOH | 90 | 0.38 | 0.32 |
| 5 | Cobalt (II) bis-benzoylacetoneethylenediimine | Hydrazine | KOH | 90 | -0.05 | 0.08 |
| 6 | Cobalt (II) bis-1-hydroxyanthraquinone | do | KOH | 90 | -0.10 | 0.10 |
| 7 | Chromium (II) phthalocyanine | Hydrogen | H₃PO₄ | 150 | 0.05 | 0.10 |
| 8 | Copper (II) bis-salicylaldehydeethylenediimine | Methanol | KOH | 90 | 0.22 | 0.41 |
| 9 | Copper (II) bis-1-hydroxyanthraquinone | Hydrazine | KOH | 90 | 0.01 | 0.20 |
| 10 | do | Potassium formate | pH 6 phosphate buffer | 90 | 0.48 | 0.52 |
| 11 | Copper (II) bis-benzoylacetonethylenediimine | Methanol | KOH | 90 | 0.44 | 0.42 |
| 12 | do | Hydrazine | KOH | 90 | -0.05 | 0.63 |
| 13 | Nickel (II) acetylacetone | Methanol | pH 6 phosphate buffer | 90 | 0.33 | 0.65 |
| 14 | Nickel (II) bis-acetylacetoneethylenediimine | do | KOH | 90 | 0.43 | 0.63 |
| 15 | Nickel (II) bis-1-hydroxydroxyanthraquinone | Hydrazine | KOH | 90 | -0.07 | 0.11 |
| 16 | do | Potassium formate | pH 6 phosphate buffer | 90 | 0.40 | 0.46 |
| 17 | Nickel (II) bis-benzoylacetoneethylenediimine | Hydrazine | KOH | 90 | -0.04 | 0.19 |
| 18 | do | Potassium formate | pH 6 phosphate buffer | 90 | 0.26 | 0.62 |
| 19 | Palladium (II) acetylacetone | Methanol | KOH | 90 | 0.10 | 0.27 |
| 20 | Palladium (II) 8-hydroxyquinoline | do | KOH | 90 | 0.54 | 0.37 |
| 21 | Palladium (II) bis-salicylaldehydeethylenediimine | do | KOH | 90 | 0.41 | 0.37 |
| 22 | Platinum (II) bis-benzoylacetoneethylenediimine | Hydrazine | KOH | 90 | 0.00 | 0.61 |
| 23 | do | Potassium formate | pH 6 phosphate buffer | 90 | 0.40 | 0.58 |
| 24 | Vanadyl (IV) bis-1-hydroxyanthraquinone | do | pH 6 phosphate buffer | 90 | 0.26 | 0.66 |
| 25 | Zinc (II) bis-1-hydroxyanthraquinone | Hydrazine | KOH | 90 | -0.01 | 0.52 |
| 26 | do | Potassium formate | pH 6 phosphate buffer | 90 | 0.45 | 0.55 |

[1] Except for N₂H₄ at 100 ma/cm².